United States Patent Office 3,647,733
Patented Mar. 7, 1972

3,647,733
AQUEOUS DISPERSION OF ETHYLENE/VINYL ALKANOATE COPOLYMER AND WAX CONTAINING NEOPRENE
John William McDonald, Wilmington, Del., assignor to E. I. du Pont de Nemours and Company, Wilmington, Del.
No Drawing. Continuation-in-part of application Ser. No. 743,335, July 9, 1968. This application Jan. 11, 1971, Ser. No. 105,705
Int. Cl. C08f 45/24, 45/52
U.S. Cl. 260—28.5 AV          8 Claims

ABSTRACT OF THE DISCLOSURE

A coating based on an ethylene/vinyl alkanoate copolymer and wax and formed from an ethylene/vinyl alkanoate copolymer and wax dispersion has increased coating adhesion to substrates at high-humidity or water-soaked conditions when neoprene is added thereto.

CROSS-REFERENCE TO RELATED APPLICATION

This application is a continuation-in-part of copending application Ser. No. 743,335, filed July 9, 1968, and now abandoned.

BACKGROUND OF THE INVENTION

Field of the invention

This invention relates to polymeric dispersions based on ethylene/vinyl alkanoate copolymers and substrates coated therewith.

Prior art

Coatings of ethylene/vinyl acetate and wax are commercially attractive due to their high moisture-barrier properties and to their low heat-sealing temperatures. However, when ethylene/vinyl acetate copolymer and wax dispersion coatings are subjected to high-humidity or water-soaked conditions, coating adhesion to porous and non-porous substrates decreases markedly and is often accompanied by coating-substrate delamination. Hence, use of ethylene/vinyl acetate copolymer and wax coatings for packaging wet materials is a problem since the adhesion between the coating and the substrate may fail. Adhesion of ethylene/vinyl acetate copolymer and wax coatings to glassine is also lowered when placed in contact with grease, so packaging of foods such as potato chips can cause adhesive coating failure along with accompanying problems of loss of moisture barrier and of heat-seal adhesion.

SUMMARY OF THE INVENTION

According to the present invention there is provided an aqueous dispersion comprising: (1) about 30 to 50% by weight of an ethylene/vinyl alkanoate copolymer of 60 to 82% by weight ethylene and 18 to 40% by weight vinyl alkanoate, (2) about 10 to 20% by weight of neoprene, and (3) about 40 to 55% by weight of a hydrocarbon wax, the dispersion containing 45 to 55% by weight of solids.

There is also provided a coated article comprising: a cellulosic substrate having the above-described polymeric composition coated on at least one surface.

DETAILED DESCRIPTION OF THE INVENTION

The ethylene/vinyl alkanoate copolymers that are useful in the present invention are copolymers which contain from 60 to 82% by weight of ethylene and 40 to 82% by weight of vinyl alkanoate, the acid portion of such vinyl alkanoate containing from 2 to 8 carbon atoms. Useful vinyl alkanoates are vinyl acetate, vinyl propionate, vinyl butyrate, vinyl 2-ethyl hexoate, or suitable mixtures thereof. Particularly preferred copolymers are the ethylene/vinyl acetate copolymers containing 18 to 40% vinyl acetate. Such copolymers and their dispersions are commercially available.

The waxes useful in the dispersion with the ethylene/vinyl alkanoate copolymer can be either animal, vegetable or mineral in origin. Waxes which are preferred are the petroleum waxes of natural origin and include paraffin and microcrystalline waxes. These waxes are mixtures of solid hydrocarbons derived from the fractional distillation of petroleum. After purification, they contain hydrocarbons that fall within the formula range of $C_{23}H_{48}$–$C_{35}H_{72}$. The waxes are hard, colorless and translucent materials having melting points generally in the range of from about 120 to 200° F., preferably, 120 to 180° F. Paraffin waxes are generally preferred over microcrystalline waxes for the present invention because they possess better moisture-proofing and are generally a better color. The wax is, of course, not limited to the wax of petroleum origin since waxes having similar properties which are of natural origin, e.g., beeswax and carnauba wax, as well as low molecular weight polyethylene wax (molecular weight of 2000 to 6000) can be used alone or in combination with petroleum waxes.

An ethylene/vinyl alkanoate and wax dispersion can be prepared as disclosed in U.S. application Ser. No. 470,237, filed July 7, 1965 by Thomas C. Bissot and assigned to the assignee of the present application. In general, a copolymer/wax blend is formed and then the blend is dispersed in an aqueous medium of water in a water-soluble surface-active agent. The proportion of copolymer in the final dispersion can be increased by blending in a quantity of ethylene/vinyl alkanoate dispersion which has been prepared as disclosed in U.S. Pat. 3,347,811 issued to Thomas C. Bissot on Oct. 17, 1967.

The dispersion of the present invention is prepared by mixing the above-identified ethylene/vinyl alkanoate copolymer and wax dispersion with a commercially available neoprene dispersion. The dispersion blend of the present invention is readily prepared by stirring together dispersions of the various components. For example, an ethylene/vinyl alkanoate copolymer and wax dispersion can be mixed with a neoprene dispersion. The dispersion will generally have a solids content of from about 45 to 55%, preferably about 50%.

The dispersions of the present invention are useful in providing moisture-barrier coatings having good adhesion to porous substrates in the presence of oil and water. The dispersions are usually applied at a coating weight less than 10 lbs./ream. Typical porous substrates are the cellulosic substrates such as the glassines, sulfite paper, kraft paper, pouch stock, newsback board, and regenerated cellulose.

Coatings can be applied by the usual techniques, such as by a trailing blade, air knife, kiss roll, Meyer rod and gravure, and can be applied with one pass or two equivalent passes. The water is removed and the coatings formed by the usual drying techniques.

A hydrolyzed ethylene/vinyl alkanoate copolymer can be used as an alternative for neoprene and will also provide moisture-barrier coatings having good adhesion to porous subtrates in the presence of oil and water. The hydrolyzed ethylene/vinyl alkanoate copolymer contains about 18 to 40% vinyl alkanoate prior to hydrolysis and is hydrolyzed to at least about 40%. While hydrolyzed ethylene/vinyl alkanoate copolymers are known as shown in U.S. Pat. 2,386,347 issued to John R. Roland on Oct. 9, 1945, as used herein, the term "hydrolyzed copolymer"

refers generally to those products wherein a portion or all of the initial vinyl alkanoate groups in the copolymer has been converted to vinyl alcohol groups, irrespective of the particular conversion technique used, e.g., alcoholysis, saponification, or hydrolysis. Consequently, hydrolyzed copolymers useful in this invention contain, in addition to ethylene groups, vinyl alcohol groups and, optionally, unhydrolyzed vinyl alkanoate groups. Also, the copolymers can contain minor amounts of other copolymerized comonomers, such as ethylenically unsaturated carboxylic acid. Useful vinyl alkanoates are vinyl acetate, vinyl propionate, vinyl butyrate, vinyl 2-ethyl hexoate or suitable mixtures thereof. Particularly preferred copolymers are the ethylene/vinyl acetate copolymers containing 18 to 40% vinyl acetate prior to hydrolysis. Dispersions of the hydrolyzed copolymers can be prepared by the post-emulsification techniques used to disperse the unhydrolyzed copolymers of ethylene and vinyl acetate.

The invention can be further understood by the following examples in which parts are by weight unless otherwise indicated.

EXAMPLES 1 AND 2

For Example 1, 80 grams of a 50% solids dispersion of 40 parts ethylene/vinyl acetate (EVA) copolymer (28% vinyl acetate) and 60 parts "Aristowax" 143/150 (a paraffin wax having a melting point of 143–150° F.) were mixed with 18 grams of a 52% solids dispersion of a 55% hydrolyzed ethylene/vinyl acetate copolymer (HEVA) having 40% vinyl acetate prior to hydrolysis to make a 32/48/20 EVA/wax/HEVA dispersion of 50% solids.

For Example 2, 90 grams of the EVA/wax dispersion were mixed with 9 grams of the HEVA dispersion to make a 36/54/10 EVA/wax/HEVA dispersion of 50% solids.

The dispersion was applied to 30-lb. glassine paper using an aqueous laboratory coater at an oven-drying temperature of 240° F. and at web speeds of 10–30 ft./min. The dispersion was metered to the web with a Meyer rod at a coating weight of 7.5 lbs./ream to form a medium high tack adhesive tape. The formulation of the dispersion and the results are shown in Table I.

EXAMPLE 3

The tests of Examples 1 and 2 were repeated on coatings made from a dispersion blend of 47 grams of a 50% solids dispersion of 15 parts ethylene/vinyl acetate copolymer (28% vinyl acetate) and 85 parts "Aristowax" 143/150, 43 grams of a 50% solids dispersion of an ethylene/vinyl acetate copolymer (28% vinyl acetate) and 9 grams of the hydrolyzed ethylene/vinyl acetate copolymer dispersion to make a 50/40/10 EVA/wax/HEVA dispersion of 50% solids. The results are shown in Table 1.

EXAMPLES 4 AND 5

The tests of Examples 1 and 2 were repeated on coatings made from a dispersion blend of 80 grams of the EVA/wax dispersion of Examples 1 and 2 and 28 grams of neoprene 450 (40% solids dispersion of polychloroprene) to make a 32/48/20 EVA/wax/neoprene dispersion of 48% solids for Example 4. For Example 5, 28 grams of neoprene 735 (38% solids dispersion of polychloroprene) was used. The results are shown in Table I.

EXAMPLES 6 AND 7

The tests of Examples 1 and 2 were repeated on coatings made from a dispersion blend of 90 grams of a 50% solids dispersion of 50 parts ethylene/vinyl acetate copolymer (28% vinyl acetate) and 50 parts "Aristowax" 143/150 and 12 grams of neoprene 735 to form a 45/45/10 EVA/wax/neoprene dispersion of 49% solids for Example 6. For Example 7, 80 grams of EVA/wax dispersian was used with 28 grams of neoprene 735 to make a 40/40/20 EVA/wax/neoprene dispersion of 48% solids. As controls, coatings were made from the EVA/wax dispersion and a dispersion blend of 96 grams of the EVA/wax dispersion and 5 grams of neoprene 735 to make a 48/48/4 EVA/wax/neoprene dispersion of 50% solids. The results are shown in Table I.

TABLE I.—EVA/WAX DISPERSION COATINGS CONTAINING HEVA OR NEOPRENE

| Example | Composition, weight percent | | | | Percent solids | Gloss measurement | | Coating weight, lbs./ 3,000 sq. ft. | TAPPI WVTR gms./ 100 sq. in./24 hr. | | Glassine adhesion in presence of— | |
|---|---|---|---|---|---|---|---|---|---|---|---|---|
| | EVA | Wax | HEVA | Neoprene | | M.D. | T.D. | | Flat | Creased | Oil, time to failure, hrs. | Water |
| 1 | 32 | 48 | 20 | | 50 | 69 | 62 | 7.5 | 0.81,0.80 | 1.3,1.1 | | Good. |
| 2 | 36 | 54 | 10 | | 50 | 70 | 57 | 7.5 | 0.72 | 1.2,1.6 | | Do. |
| 3 | 50 | 40 | 10 | | 50 | 87 | 83 | 7 | 0.17,0.18 | 0.41,0.30 | 200 | Do. |
| 4 | 32 | 48 | | 20 | 48 | 76 | 71 | 6 | 0.18,0.09 | 0.36,0.33 | 200 | Do. |
| 5 | 32 | 48 | | 20 | 48 | 77 | 71 | 6 | 0.11,0.15 | 0.65,0.32 | | Do. |
| Control | 50 | 50 | | | 50 | 87 | 75 | 7.5 | 0.23,0.20 | 0.27,0.30 | 30–50 | Very poor. |
| Do | 48 | 48 | | 4 | 50 | 85 | 74 | 7.5 | 0.50,0.60 | 0.80,0.48 | | Poor. |
| 6 | 45 | 45 | | 10 | 49 | 84 | 69 | 7.5 | 0.23,0.22 | 0.30,0.46 | | Medium. |
| 7 | 40 | 40 | | 20 | 48 | 79 | 66 | 6.5 | 0.36,0.20 | 0.45,0.50 | | Good. | glossy film as shown by the gloss. Gloss was measured in both the machine direction (M.D.) and transverse direction (T.D.) with a Gardner 75° Glossometer. The coating was tested for moisture barrier on both the flat and creased webs, using the TAPPI cup moisture vapor transmission rate method (TAPPI–T 464 M–45).

Adhesion to glassine in the presence of water was measured by immersing the coated article in water and observing coating-substrate delamination. Good adhesion denotes glassine disintegration. Adhesion to glassine in the presence of grease was measured by placing a blotter saturated with cottonseed oil on the coating. At various time intervals the blotter and excess oil were removed, and maintenance of coating adhesion was tested with Since the EVA/wax coating delaminated within several minutes, it was rated very poor in adhesion to glassine in the presence of water. The EVA/wax/HEAV or neoprene coatings maintained coating adhesion for periods of 15–30 minutes, or until the glassine disintegrated, and were rated medium to good. As can be seen from the table, coatings from the subject dispersions gave adhesion to glassine in the presence of oil about double that obtained with the EVA/wax coating.

What is claimed is:

1. An aqueous dispersion comprising: (1) about 30 to 50% by weight of an ethylene/vinyl alkanoate copolymer of 60 to 82% by weight ethylene and 18 to 40% by weight vinyl alkanoate, (2) about 10 to 20% by weight of neoprene, and (3) about 40 to 55% by weight of a hydrocarbon wax, said dispersion containing about 45 to 55% by weight of solids.

2. The dispersion of claim 1 wherein the vinyl alkanoate is vinyl acetate.

3. The dispersion of claim 2 wherein the dispersion contains about 20% by weight of neoprene.

4. The dispersion of claim 2 wherein the hydrocarbon wax is paraffin wax having a melting point within the range of 120 to 180° F.

5. An article comprising: a cellulosic substrate and a coating on at least one surface of (1) about 30 to 50% by weight of an ethylene/vinyl alkanoate copolymer of 60 to 82% by weight ethylene and 18 to 40% by weight vinyl alkanoate, (2) about 10 to 20% by weight of neoprene, and (3) about 40 to 55% by weight of a hydrocarbon wax.

6. The article of claim 5 wherein the ethylene/vinyl alkanoate copolymer is an ethylene/vinyl acetate copolymer.

7. The article of claim 6 wherein the coating contains about 20% neoprene.

8. The article of claim 6 wherein the hydrocarbon wax is a paraffin wax having a melting point within the range of 120 to 180° F.

No references cited.

MORRIS LIEBMAN, Primary Examiner

P. R. MICHL, Assistant Examiner

U.S. Cl. X.R.

117—155 UA; 260—28.5 B, 29.6 WA, 29.7 UA